June 12, 1951    E. C. BOWAR    2,556,519
CONTROL DEVICE
Filed June 23, 1948    2 Sheets-Sheet 1
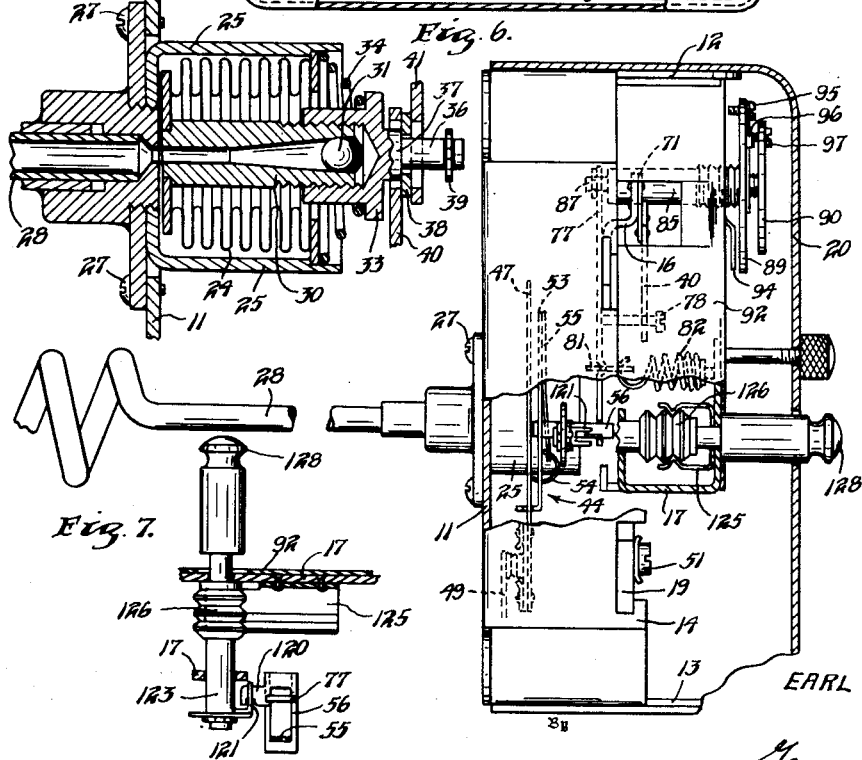
Inventor
EARL C. BOWAR
George H. Fisher
Attorney June 12, 1951  E. C. BOWAR  2,556,519
CONTROL DEVICE
Filed June 23, 1948  2 Sheets-Sheet 2
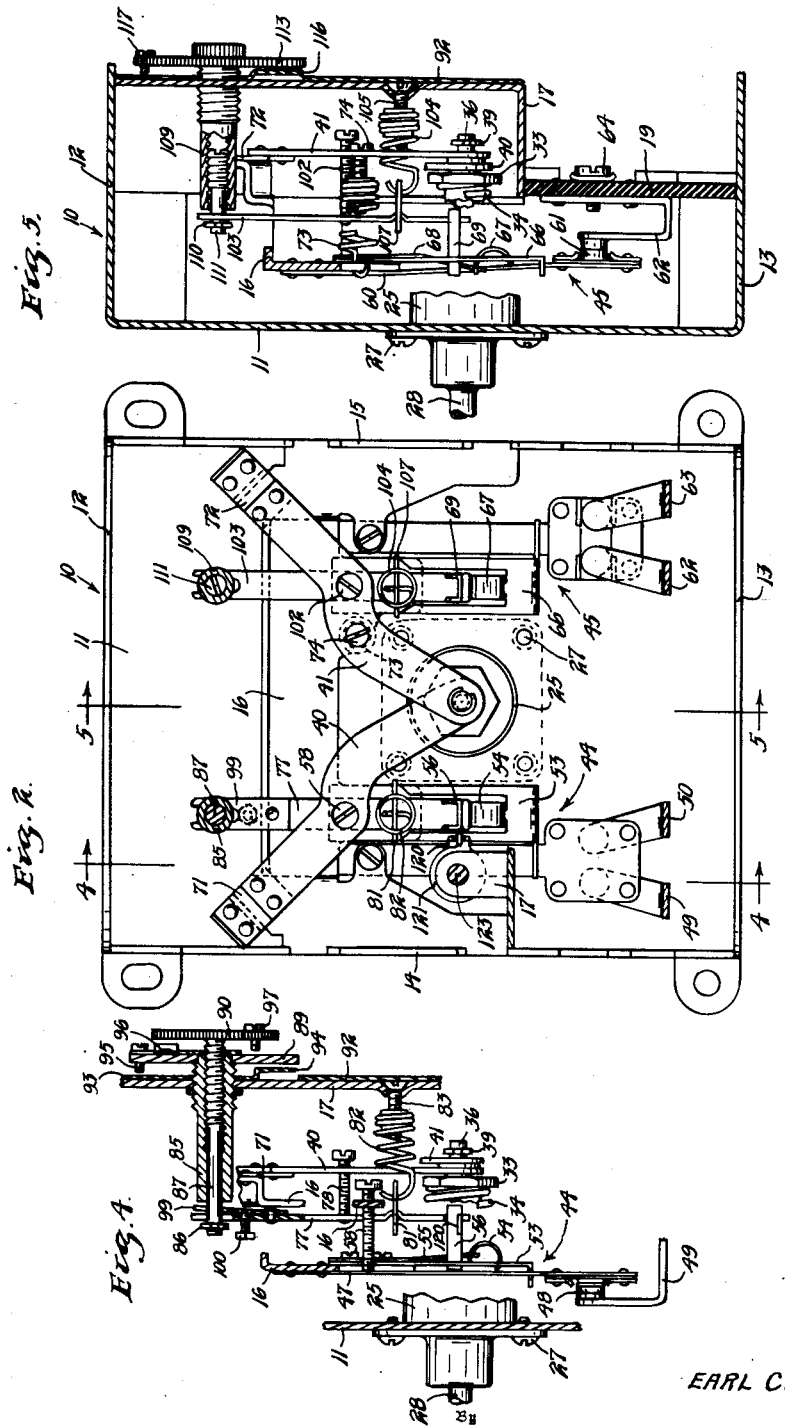
Inventor
EARL C. BOWAR
George H. Fisher
Attorney Patented June 12, 1951

2,556,519

UNITED STATES PATENT OFFICE 2,556,519

CONTROL DEVICE

Earl C. Bowar, Minneapolis, Minn., assignor to Minneapolis-Honeywell Regulator Company, Minneapolis, Minn., a corporation of Delaware Application June 23, 1948, Serial No. 34,799

11 Claims. (Cl. 200—83)

This invention relates to condition responsive control devices and is particularly concerned with mechanism for adjusting the condition values at which a control element, such as a snap switch, will be moved to its two operative positions.

An object of the invention is to provide a condition responsive switching mechanism in which the adjusted values of the cut-in and cut-out points are independently indicated.

Another object is to provide a switching mechanism in which manual adjustment of one control point simultaneously adjusts the other control point but in which adjustment of the other control point does not change the first control point.

Another object is to provide a novel floating lever control linkage which eliminates backlash and its attendant inaccuracies.

Other objects will be apparent from the specification and appended claims and from the drawings, in which Figure 1 is an elevation of a device incorporating the various features of the invention with the cover largely broken away to show the manual adjusting dials;

Figure 2 is an elevation, viewed as in Figure 1, but with the front portion of the frame broken away to show the lever mechanism;

Figure 3 is a sectional view of the temperature responsive element;

Figure 4 is a fragmentary sectional view taken substantially on line 4—4 of Figure 2;

Figure 5 is a sectional view taken substantially on line 5—5 of Figure 2;

Figure 6 is an elevation looking from the left side of Figure 1 with a portion of the instrument cover and frame broken away to show the manual switching arrangement, and Figure 7 is a fragmentary view of the manual switching arrangement shown in Figure 6, but viewed from below.

The illustrative embodiment of the invention is a combination fan and limit switch having a temperature sensing element adapted to be inserted in the bonnet of a warm air furnace. The fan switch is adjusted to cut in and cut out at temperatures that may be read directly on concentric dials. The limit switch setting indicates only cut out temperature but provision is made to adjust the differential of operation.

Both the fan and limit switches are operated by linkages incorporating "floating" levers. In Judson Patent No. 2,298,795 several floating lever switching arrangements are shown, but these arrangements have the disadvantage that forces are reversed at certain points in the mechanisms on actuation of the switch in opposite directions. The present invention provides switch actuation by changing the magnitude of a unidirectional force and so eliminates inaccuracies due to backlash and enables an instrument to be made that will operate accurately without the expense of precision machining operations in its manufacture. This feature is particularly advantageous where the sensing element is of the expanding liquid type which provides relatively small movement per degree of temperature change.

Referring now to the drawings, it will be noted that the various operative parts of the mechanism are carried by a supporting frame 10 having a flat back portion 11, forwardly extending top and bottom portions 12 and 13, and forwardly extending side portions 14 and 15. A subframe 16 is supported by the sides 14 and 15 of the frame 10, and a plate 17 is supported by the top portion 12 as well as by the side portions 14 and 15 of the frame 10. An insulating panel 19 is secured to the side portions 14 and 15 of frame 10 between the plate 17 and the bottom portions 13. A cover 20 encloses the open portion of the frame 10 to protect the operative parts of the device.

The thermally responsive element is shown in detail in Figure 3. A flexible metal bellows 24 is contained within a cup 25. The inner end of the bellows 24 is, in effect, sealed and the outer end of the bellows is attached to the rim of the cup 25 to form an expansible chamber. The cup 25 is attached to the portion 11 of the frame by screws 27 and a flexible metal tube 28 extends from the rear of the instrument frame, and, with the device suitably mounted on the bonnet of the warm air furnace, the tube 28 will be subjected to the bonnet temperature. The interior of the tube 28 as well as the interior of the chamber formed by the bellows 24 and cup 25 is filled with a liquid whose coefficient of thermal expansion is greater than the metal parts involved. A post 30 extends outwardly from the bottom of the bellows 24 to actuate the switching mechanism on changes in temperature. The post 30 is axially bored to facilitate filling and a conical portion of this opening is closed by a ball 31 after the interior of the tube 28 and expansible chamber have been filled with temperature responsive liquid. The chamber is hermetically sealed by soldering the ball 31 in place in the post 30.

The post 30 is screw-threaded at its outer end and a cap 33 is threaded thereon. A compression spring 34 acting between the cup 25 and the cap 33 exerts a force on the post 30 tending to increase the volume of the expansible chamber. In case a leak should develop anywhere in the tube 28 or bellows 24 the post 30 will be moved outwardly in the same manner as would occur on a rising temperature to provide for "fail safe" operation. The cap 33 is provided with an extension 36 having a shoulder 37 which abuts a washer 38. A snap washer 39 is provided on the extension 36 to secure the washer 38 in proper position under all temperature conditions and to facilitate assembly. The washer 38, which is positioned in accordance with changes in temperature, similarly positions levers 40 and 41 which are operatively connected to a fan switch 44 and to a limit switch 45 respectively as shown in Figure 2.

The fan switch 44 and its operating mechanism is best illustrated in Figure 4. A spring strip 47 is secured at its upper end to the sub-frame 16 and at its lower end carries a contact bridging member 48. The member 48 is suitably insulated from the spring strip 47 and serves to electrically connect a pair of contacts carried on the ends of contact arms 49 and 50 which are supported by the insulating panel 19 and provided with electrical connections 51 and 52. Strip 47 is actuated to bridge and unbridge the contacts by a second spring strip 53 which at its lower end is adapted to engage the strip 47. The upper end of strip 53 is likewise attached to the sub-frame 16. A spring compression member 54 is pivotally connected to the spring strip 53 and to a third strip 55 also secured to the sub-frame 16. A link 56 which is adapted to act only in tension to connect the strip 55 to a floating lever will be hereinafter described. The spring strip 55 is preshaped to exert a bias from the position shown in Figure 4 so that when permitted it will move the upper end of the spring member 54 to the left until the spring 54 tends to go over center with respect to the strip 53 to move the strip 53 to the right. The spring strip 53 will then snap the lower end of the spring strip 47 and the contact bridging member 48 to the right to open the fan circuit. The spring strip 47 is preformed to assume a shape biasing its lower end to the right. A screw 58 threaded in a portion of the sub-frame 16 is adjusted to determine the amount of bias of the spring strip 47 tending to open the contact. The screw 58 is adjusted so that movement of the link 56 to the right will actuate the switch to closed position and movement to the left will permit the switch to open.

The limit switch 45 as shown in Figure 5 is similar to the fan switch 44 with the exception that it is a "normally closed" switch. A spring strip 60 is secured at its upper end to the sub-frame 16 and is preformed to exert a bias at its lower end to move a contact bridging member 61 to the right to bridge a pair of contacts carried by contact arms 62 and 63 which are secured to the panel 19 and are provided with a pair of terminals 64 and 65. The strip 60 is actuated by a spring strip 66 which in turn is actuated by a compression spring member 67 the upper end of which is positioned by another spring strip 68, the upper ends of each of these strips being secured to the sub-frame 16. A tension link 69 moves the strip 69 from its normal position as shown in Figure 5 to move the upper end of the compression spring 67 to the right which in turn will result in snapping the strip 66 to the left to move the strip 60 and the contact bridging member 61 to the left to open the contacts.

It will be appreciated that in each of the switches herein described, as in any snap switch, the snap action is obtained by storing energy prior to the occurrence of the snap and therefore there is a difference in the position of the switch actuator at which the switch is moved to open position on the one hand and to closed position on the other hand. Likewise the force that must be applied to the switch actuator to operate the switch to one of its operative positions is different than the force required to actuate the switch to its other operative position.

The lever 40 which actuates the fan switch, referred to above, is pivoted to the sub-frame 16 by a spring strip 71 and the lever 41 which actuates the limit switch is pivoted to the sub-frame 16 by a spring strip 72. A tension spring 73 connected to the lever 41 by a screw 74 has its lower end secured to the sub-frame 16 and biases the lower end of the lever 41 into engagement with the washer 38 (shown in Figure 3) so that movements of the lower end of the lever 41 will follow the movements of the bellows 24 in response to temperature variations. Since, as will appear hereinafter, the fan switch actuating lever 40 must be moved inwardly to actuate the fan switch and the switching mechanism exerts an outward bias on this lever the lower end of this lever will also engage the washer 38 and follow movement of the bellows 24.

As seen in Figure 4 the lever 40 serves as a connection between the condition responsive element, in this case the expansible chamber including the bellows 24, and a "floating lever" 77. A screw 78 which is threaded in the lever 40 serves as an adjustable connection between the two levers. The lower end of the floating lever 77 engages the link 56 which actuates the fan switch 44. Intermediate the screw 78 and the link 56 the floating lever 77 is biased to the right by a link 81 which is connected to a tension spring 82 that is adjustably connected to the plate 17 by a screw 83.

The biasing effect of the spring 82 on the floating lever 77 is such that, considering the screw 78 as a fulcrum, the lower end of lever 77 is biased to the right with a force intermediate the force values that must be exerted on the link 56 to actuate the fan switch to closed position or the smaller force value that will permit the switch bias to move the switch to open position. Thus, without any other forces influencing the lever 77 the switch 44 will remain in either open or closed position.

The upper end of the floating lever 77 moves between a pair of adjustable stops formed by (1) a sleeve 85 that is screw-threaded in the plate 17 and (2) a spring washer 86 carried by the end of a rod 87 which is adjustably threaded in the sleeve 85. A dial 89, provided with suitable indicia of temperature, is secured to the outer end of the sleeve 85 and is adapted to be manually rotated to select the temperature value at which the fan switch will be actuated to closed position. A dial 90 is secured to the outer end of the rod 87 and is likewise provided with suitable indicia of temperature and may be manually rotated to select the temperature value at which the fan switch will be actuated to open position. The indicia on the dial 89 and 90 cooperate with a fixed mark or index 91 which may be engraved on a thin plate 92 that may carry other suitable legends and that may be suitably secured over the plate 17. A stop plate 93, also attached to the plate 17, is provided with a raised portion 94 that cooperates with a screw 95 carried by the dial 89 to limit rotation thereof to the desired temperature range. The screw 95 also secures a stop member 96 to the dial 89 and this stop member cooperates with a screw 97 in the dial 90 to limit rotation of the dial 90 with respect to the dial 89 to assure proper correlation between the indicia on the two dials.

To the upper end of the floating lever 77 is secured a spring strip 99 which normally lies flat against the lever but which may be separated therefrom by a screw 100. Adjustment of the screw 100 changes the effective thickness of the floating lever 77 to correlate the temperature readings on the dial 89 and 90. With a predetermined dial setting it is then possible to adjust the screw 100 so that the indicated difference in temperature as indicated on the dials 89 and 90 will correspond to the actual temperature difference necessary to move the fan switch between open and closed position.

In operation, should the temperature fall from the value existing with the parts as shown in Figure 4, the volume of liquid contained between the bellows 24 and cup 25 will be reduced and the lower end of the lever 40 will be moved to the left. The screw 78 connecting the lever 40 and the floating lever 77 will likewise be moved to the left and the upper end of the floating lever 77 will be moved toward the spring washer 86. When the lever 77 is stopped from further movements by the washer 86, further movement of screw 78 will pivot the floating lever 77 about the washer 86 to move the link 56 to the left, permitting the fan switch 44 to move to open position. If the temperature should again rise, the screw 78 will be moved to the right but the switch will not be moved to closed position until the upper end of the floating lever 77 is moved into engagement with the sleeve 85. Although the tension spring 82 does not exert sufficient force to move the switch to closed position when the lever 77 is located solely by the screw 78 and the link 56, when the lever 77 (through the spring strip 99) engages the sleeve 85, the component of the spring 82 acting on the link 56 is increased and the switch will be moved to closed position. In effect, the upper fulcrum for the floating lever 77 is shifted from the screw 78 to the sleeve 85, increasing the effect of the spring 82 on the link 56.

As seen in Figure 5, the limit switch actuating mechanism is similar to the fan switch mechanism except that no provision is made for manual adjustment and indication of the temperature value at which the switch will be closed. A screw 102 in threaded engagement with the lever 41 pivotally abuts a floating lever 103 the lower end of which is in engagement with the link 69 that actuates the limit switch 45. A spring 104 which is adjustably connected to the plate 17 by a screw 105 is connected to the floating lever 103 by a link 107 intermediate the link 69 and the screw 102. The upper end of the floating lever 103 is adapted to engage a stop provided by one end of a sleeve 109 and a stop provided by a spring washer 110 secured to the end of a rod 111. The rod 111 is screw-threaded in the sleeve 109 and is adjustable therein to vary the spacing between the stops for the upper end of the lever 103 to determine the operating differential of the limit switch. The sleeve 109 is screw-threaded in the plate 17 and is provided with a dial 113 having suitable indicia of temperature thereon. An index 114 on the plate 92 cooperates with the indicia on the dial to indicate the temperature at which the limit switch will open. The stop plate 93 is provided with a raised portion 116 which cooperates with a screw 117 in the dial 113 to prevent rotation of the dial 113 beyond the position at which the indicia properly indicates the temperature setting.

On a rise in temperature from the position shown in Figure 5 the lever 41 will be moved to the right and the screw 102 will be moved to permit pivotal movement of the floating lever 103 toward the sleeve 109 under the influence of the tension spring 104. Further movement of the screw 102 to the right after lever 103 engages the sleeve 109 will result in the shifting of the upper fulcrum for the lever 103 from the screw 102 to the sleeve 109 to change the component of the force of the spring 104 acting on the link 69. The spring 104 will then exert a sufficient force on the link 69 to move the limit switch 45 to open position. On a reduction in temperature the screw 102 will move the upper end of the floating lever 103 to the left until the spring washer 111 is engaged. Further movement of the screw 102 to the left will pivot the floating lever 103 in a clockwise direction to permit the link 69 to move to the left to reclose the limit switch 45.

In Figures 6 and 7 is shown a manual switching mechanism by means of which the fan switch may be actuated to closed position regardless of temperature. It is possible by operating the fan of a warm air furnace during the summer to provide a cooling effect in the living quarters of a house either by merely circulating the air or by forcing cool basement air into the living quarters. The link 56 which connects the fan switch and the floating lever 77 is provided with a laterally extending portion 120 which affords a one-way connection with a member 121 that is secured to the lower end of a manually shiftable post 123. The post 123 is slideable in the plate 17 to bring the member 121 into engagement with the extension 120 of the link 56 to actuate the fan switch to closed position regardless of the position of the floating lever 77. It will be noted that the floating lever 77 also has a one-way connection with the link 56 and hence the link 56 may be moved to close the fan switch without affecting the position of the floating lever 77. A suitably formed spring strip 125 is secured to the plate 17 and is adapted to cooperate with an enlarged portion 126 on the post 123 which in effect provides a hill that must be moved with respect to the spring member 125 in shifting the post 123 between its inner and outer position. The spring member 125 thus holds the post 123 in either position. A manual actuable knob 128 on the outer end of the post 123 extends through the instrument cover 20.

While the device has been described as a temperature responsive switching mechanism for controlling electric circuits, it will be apparent that any other switching mechanism could be substituted without departing from the inventive concept. For example, a pilot valve having a differential of force required at its operating member between the cut-on and cut-off positions could be considered as one type of switch that could be substituted for the electric snap switch described. Likewise, the inventive concept is not limited to a liquid fill temperature responsive element but might be any condition responsive element such as a pressure responsive element. The scope of the invention is to be determined only by the appended claims.

I claim as my invention:

1. In a control device, a support, a floating lever having one portion positioned by a condition responsive element, a second portion operatively connected to a snap switch and a third portion movable between a pair of adjustable stops, one of said stops being adjustable by a sleeve screw-threaded in said support and the other of said stops being an enlargement carried on the end of a member screw-threaded in said sleeve.

2. In a control device, a support, a floating lever having one portion positioned by a condition responsive element, a second portion operatively connected to a snap switch and a third portion movable between a pair of adjustable stops, one of said stops being adjustable by a sleeve screw-threaded in said support and the other of said stops being an enlargement carried on the end of a member screw-threaded in said sleeve, a dial on said sleeve and a dial on said member, each of said dials having indicia cooperating with an index on said support.

3. In a control device, a support, a floating lever having one portion positioned by a condition responsive element, a second portion operatively connected to a snap switch and a third portion movable between a pair of adjustable stops, one of said stops being adjustable by a sleeve screw-threaded in said support and the other of said stops being an enlargement carried on the end of a member screw-threaded in said sleeve and cooperating indicia on said sleeve, said member and said support.

4. In a control device, a two position snap switch, an actuator for said switch, said switch being operated to one position by application of a predetermined force on said actuator and operated to the other position on a predetermined reduction in force on said actuator, a floating lever having a first portion having a one way engagement with said actuator, condition responsive means for positioning a second portion of said lever, a pair of stops for limiting movement of a third portion of said lever, and a spring connected to a fourth portion of said lever and biasing said lever to produce a force on said actuator intermediate the forces required to actuate said switch to its two operative positions.

5. In a control device, a two position snap switch, an actuator for said switch, said switch being operated to one position by application of a predetermined force on said actuator and operated to the other position on a predetermined reduction in force on said actuator, a floating lever having a first portion having a one way engagement with said actuator, condition responsive means for positioning a second portion of said lever, a pair of stops for limiting movement of a third portion of said lever, and means engaging a fourth portion of said lever for biasing said lever to produce a force on said actuator intermediate the forces required to actuate said switch to its two operative positions.

6. In a control device, a snap switch of the type that is moved between two operative positions by varying the magnitude of a unidirectional force on a switch actuator, a condition responsive element and a member positioned thereby in accordance with condition value, a lever interconnecting said member and said switch actuator, biasing means acting on said lever and biasing said lever in one direction with respect to said member and further biasing said lever with respect to said switch actuator to exert a force on said actuator intermediate the force values required to actuate said switch to its two operative positions, and a stop adapted to engage said lever at a predetermined condition value to change the leverage of said biasing spring on said actuator so that said biasing means exerts a force on said actuator through said lever to actuate said switch to one of its operative positions.

7. In a control device, a snap switch of the type that is moved between two operative positions by varying the magnitude of a unidirectional force on a switch actuator, a condition responsive element and a member positioned thereby in accordance with condition value, a lever interconnecting said member and said switch actuator and having one way connections with said member and said switch actuator, biasing means acting on said lever and biasing said lever in one direction with respect to said member and further biasing said lever with respect to said switch actuator to exert a force on said actuator intermediate the force values required to actuate said switch to its two operative positions, and a stop adapted to engage said lever at a predetermined condition value to change the leverage of said biasing spring on said actuator so that said biasing means exerts a force on said actuator through said lever to actuate said switch to one of its operative positions.

8. In a control device, a snap switch of the type that is moved between two operative positions by varying the magnitude of a unidirectional force on a switch actuator, a condition responsive element and a member positioned thereby in accordance with condition value, a lever interconnecting said member and said switch actuator, biasing means acting on said lever and biasing said lever in one direction with respect to said member and further biasing said lever with respect to said switch actuator to exert a force on said actuator intermediate the force values required to actuate said switch to its two operative positions, a first stop adapted to engage said lever at a predetermined condition value to change the leverage of said biasing spring on said actuator so that said biasing means exerts a force on said actuator through said lever to actuate said switch to one of its operative positions and a second stop adapted to engage said lever at a different condition value to actuate said switch to its other operative position.

9. In a control device, a snap switch of the type that is moved between two operative positions by varying the magnitude of a unidirectional force on a switch actuator, a condition responsive element and a member positioned thereby in accordance with condition value, a lever interconnecting and having a one way connection with both said member and said switch actuator, biasing means acting on said lever and biasing said lever in one direction with respect to said member at all operative switch positions and further biasing said lever with respect to said switch actuator to exert a force on said actuator intermediate the force values required to actuate said switch to its two operative positions, and a pair of stops adapted to engage opposite sides of another portion of said lever, one of said stops being adjustable by a sleeve screw-threaded in a stationary support and the other of said stops being adjustable by a member screw-threaded in said sleeve.

10. In a control device, a snap switch of the type that is moved between two operative positions by varying the magnitude of a unidirectional force on a switch actuator, a condition responsive element and a member positioned thereby in accordance with condition value, a lever interconnecting and having a one way connection with both said member and said switch actuator, biasing means acting on said lever and biasing said lever in one direction with respect to said member at all operative switch positions and further biasing said lever with respect to said switch actuator to exert a force on said actuator intermediate the force values required to actuate said switch to its two operative positions, a pair of stops adapted to engage opposite sides of another portion of said lever, one of said stops being adjustable by a sleeve screw-threaded in a stationary support and the other of said stops being adjustable by a member screw-threaded in said sleeve, a dial on said sleeve and a dial on said screw-threaded member, each of said dials having indicia cooperating with an index on said support.

11. In a control device, a support, a floating lever, a condition responsive element, an adjustable connection between said condition responsive element and one portion of said lever, a snap switch operatively connected to a second portion of said lever, a pair of stops disposed on opposite sides of a third portion of said lever, one of said stops being adjustable by a sleeve screw threaded in said support and the other of said stops being adjustable by a member screw threaded in said sleeve, cooperating indicia on said members and on said support for indicating condition value at which said switch will be moved to on and off positions, and means carried by said lever for varying the effective thickness of the third portion of said lever to correlate the indicia on said two members.

EARL C. BOWAR.

REFERENCES CITED

The following references are of record in the file of this patent:

UNITED STATES PATENTS

| Number | Name | Date |
| --- | --- | --- |
| 1,721,012 | Fagan | July 16, 1929 |
| 2,291,501 | Persons | July 28, 1942 |
| 2,291,554 | Muchow | July 28, 1942 |
| 2,493,323 | Simson | Jan. 3, 1950 |